US009812931B2

(12) United States Patent
Lankin et al.

(10) Patent No.: US 9,812,931 B2
(45) Date of Patent: Nov. 7, 2017

(54) APPARATUS FOR SWITCHING BETWEEN WYE AND DELTA CONFIGURATIONS IN AN ELECTRIC MOTOR

(71) Applicant: Accelerated Systems Inc., Waterloo (CA)

(72) Inventors: Robert Gordon Lankin, Waterloo (CA); Stanley Arthur Baer, Waterloo (CA); Jason Cornelius Wiseman, Waterloo (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 610 days.

(21) Appl. No.: 14/354,657

(22) PCT Filed: Oct. 24, 2012

(86) PCT No.: PCT/CA2012/000976
§ 371 (c)(1),
(2) Date: Apr. 28, 2014

(87) PCT Pub. No.: WO2013/059914
PCT Pub. Date: May 2, 2013

(65) Prior Publication Data
US 2014/0285041 A1 Sep. 25, 2014

Related U.S. Application Data

(60) Provisional application No. 61/551,891, filed on Oct. 26, 2011.

(51) Int. Cl.
*H02K 11/00* (2016.01)
*B60K 1/00* (2006.01)
(Continued)

(52) U.S. Cl.
CPC ........... *H02K 11/001* (2013.01); *A01D 34/00* (2013.01); *A01D 69/02* (2013.01); *B60K 1/00* (2013.01);
(Continued)

(58) Field of Classification Search
CPC .......... A01D 34/00; A01D 69/02; B60K 1/00; B60K 7/0007; H02K 11/001; H02K 3/522; H02K 7/1021; H02K 11/20
(Continued)

(56) References Cited

U.S. PATENT DOCUMENTS

| 4,916,376 A | 4/1990 | Kume et al. |
| 5,675,222 A | 10/1997 | Fliege |
| 2007/0069667 A1 | 3/2007 | Adra |

FOREIGN PATENT DOCUMENTS

| EP | 1111757 A2 * | 6/2001 | ............. H02K 3/522 |
| JP | 09215385 A * | 8/1997 | |
| JP | 2003052186 A * | 2/2003 | |

OTHER PUBLICATIONS

Translation of foreign document JP 2003052186 A (Year: 2003).*
(Continued)

*Primary Examiner* — Alex W Mok
(74) *Attorney, Agent, or Firm* — Bereskin & Parr LLP

(57) ABSTRACT

An electric motor, including a motor assembly having a rotor and a stator, and a switching assembly adapted to switch the motor assembly between a wye configuration, a delta configuration, and a neutral configuration. The switching assembly may include a plurality of actuators configured to move at least two movable contact members so as to select which configuration of the motor assembly is active.

18 Claims, 13 Drawing Sheets

(51) Int. Cl.
    *A01D 34/00*     (2006.01)
    *H02K 7/102*     (2006.01)
    *H02K 3/52*     (2006.01)
    *A01D 69/02*     (2006.01)
    *H02K 11/20*     (2016.01)
    *B60K 7/00*     (2006.01)

(52) U.S. Cl.
    CPC ........... *H02K 3/522* (2013.01); *H02K 7/1021* (2013.01); *H02K 11/20* (2016.01); *B60K 7/0007* (2013.01)

(58) Field of Classification Search
    USPC .......................................... 310/71, 75 R, 77
    See application file for complete search history.

(56) References Cited

OTHER PUBLICATIONS

ISA/CA Canadian Intellectual Property Office, Notification of Transmittal of the International Search Report and the Written Opinion of the International Searching Authority for corresponding International PCT Application Serial No. PCT/CA2012/000977, or the Declaration, dated Jan. 31, 2013, 8 pages.
U.S. Office Action for corresponding U.S. Appl. No. 14/354,655 dated Mar. 28, 2016, 22 pages.

\* cited by examiner

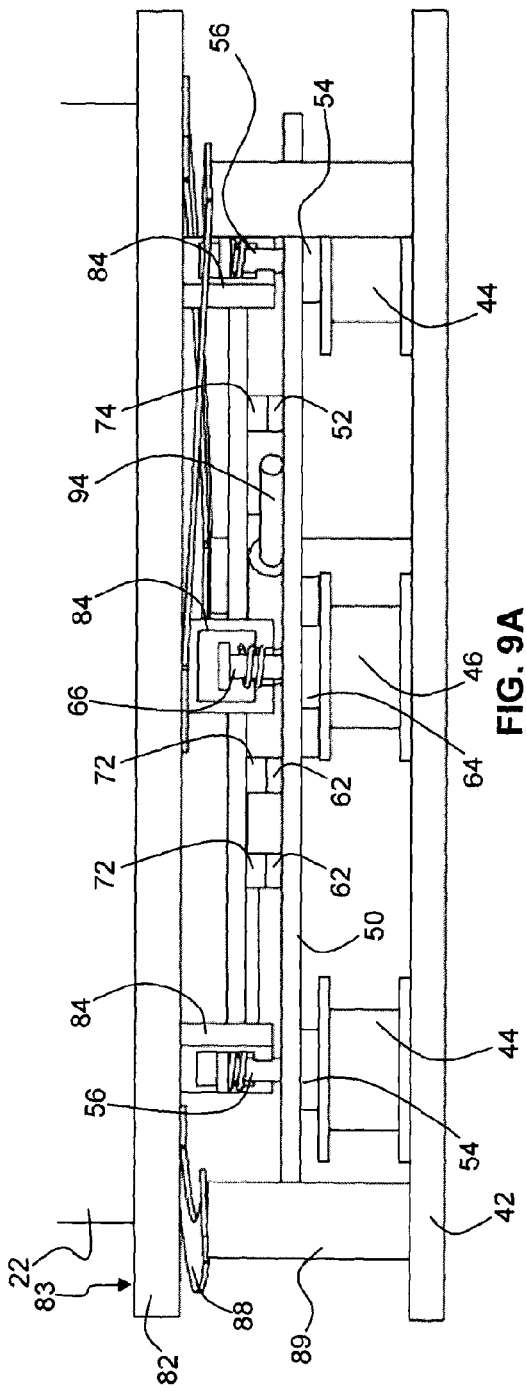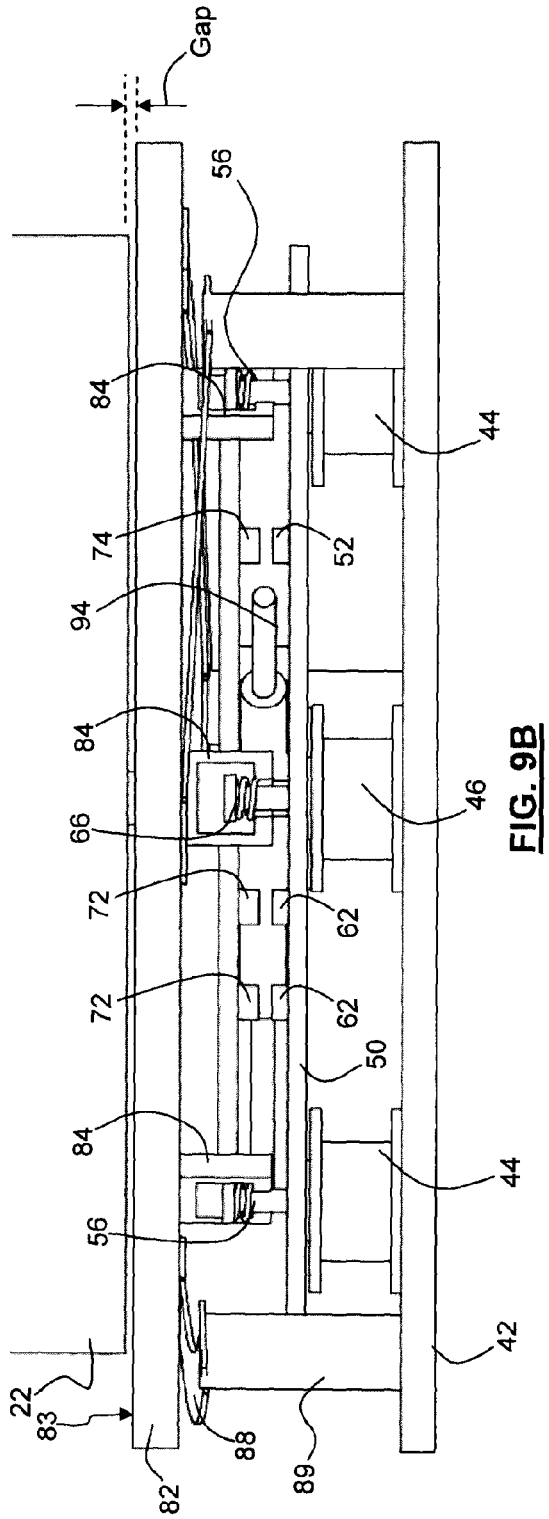

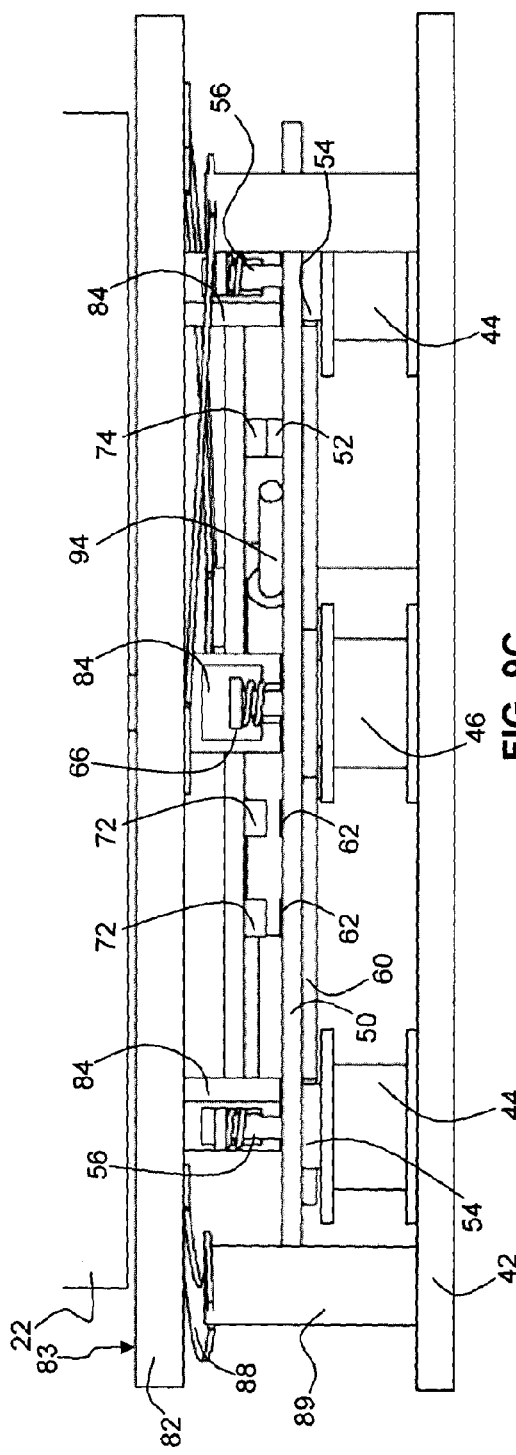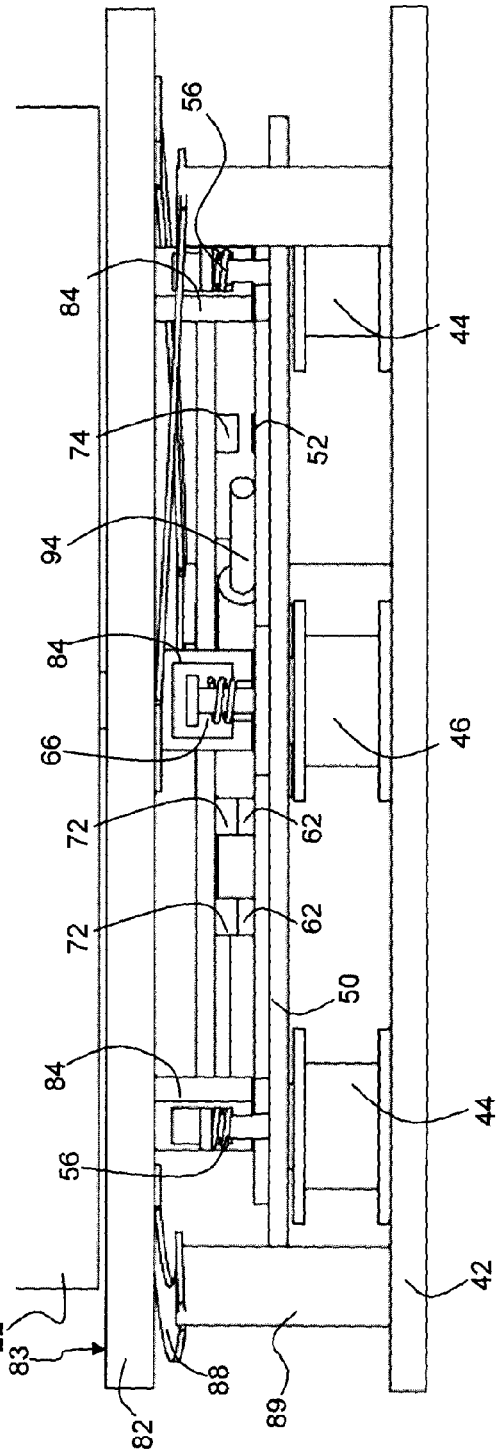
FIG. 9C
FIG. 9D

APPARATUS FOR SWITCHING BETWEEN WYE AND DELTA CONFIGURATIONS IN AN ELECTRIC MOTOR

RELATED APPLICATIONS

This application claims the benefit of U.S. Provisional Patent Application Ser. No. 61/551,891 filed Oct. 26, 2011 and entitled "APPARATUS FOR SWITCHING BETWEEN WYE AND DELTA CONFIGURATIONS IN AN ELECTRIC MOTOR", the entire contents of which are hereby incorporated by reference herein for all purposes.

TECHNICAL FIELD

The embodiments herein relate to electric motors, and in particular to apparatus and methods for switching between wye and delta configurations for electric motors in electric vehicles, for example battery powered lawn mowers, electric scooters and other vehicles.

INTRODUCTION

Riding lawn mowers, riding snow blowers, riding lawn tractors, and other small vehicles are often powered by electric motors. Electric motors can normally be configured in two ways that provide different operating characteristics. In particular, the motor windings can be electrically connected in a "delta" configuration or a "wye" configuration.

In a delta configuration, the motor windings are connected to each other in series in a triangle-like circuit and power is applied at each of the connections. When in this configuration, the motor will generally provide low amounts of torque when operating at low rpm, but is capable of operating at very high rpm. Thus, the delta configuration can be thought of as a "high speed, low torque" configuration.

Conversely, in a wye configuration (also called a star configuration) the windings are connected to a common central point (e.g. in parallel) and power is applied to the remaining end of each winding. In this configuration, the motor will generally provide a comparatively high torque at low rpm, but will not be capable of as high rpms as the delta configuration. Thus, the wye configuration can be thought of as a "high torque, low speed" configuration.

In some applications, for example when using a battery powered riding lawn mower, different operating conditions might benefit from the different motor configurations. For example, when a mower is being operated on a smooth surface (e.g. driving on a smooth road) it may be desirable that the mower be capable of moving at high speeds. However, when the mower encounters rough terrain, such as mud or heavy grass, it may be more desirable to have higher torque as opposed to a high top speed.

Accordingly, the inventors have recognized that it would be beneficial to be able to switch between motor configurations on an electric riding mower or other electric vehicle.

SUMMARY OF SOME EMBODIMENTS

According to some embodiments, an electric motor, including a motor assembly having a rotor and a stator, and a switching assembly adapted to switch the motor assembly between a wye configuration, a delta configuration, and a neutral configuration. The switching assembly may include a plurality of actuators configured to move at least two movable contact members so as to select which configuration of the motor assembly is active.

According to some other embodiments, a riding lawnmower or other electric vehicle comprising at least one electric motor, each motor including a motor assembly having a rotor and a stator, and a switching assembly adapted to switch the motor assembly between a wye configuration, a delta configuration, and a neutral configuration.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 9A is a side view of the motor of FIG. 1 with the brake on;
FIG. 9B is a side view of the motor with the brake off and the motor in neutral;
FIG. 9C is a side view of the motor with the brake off and the motor in a wye configuration;
FIG. 9D is a side view of the motor with the brake off and the motor in a delta configuration.

DETAILED DESCRIPTION OF VARIOUS EMBODIMENTS

Figure 1:
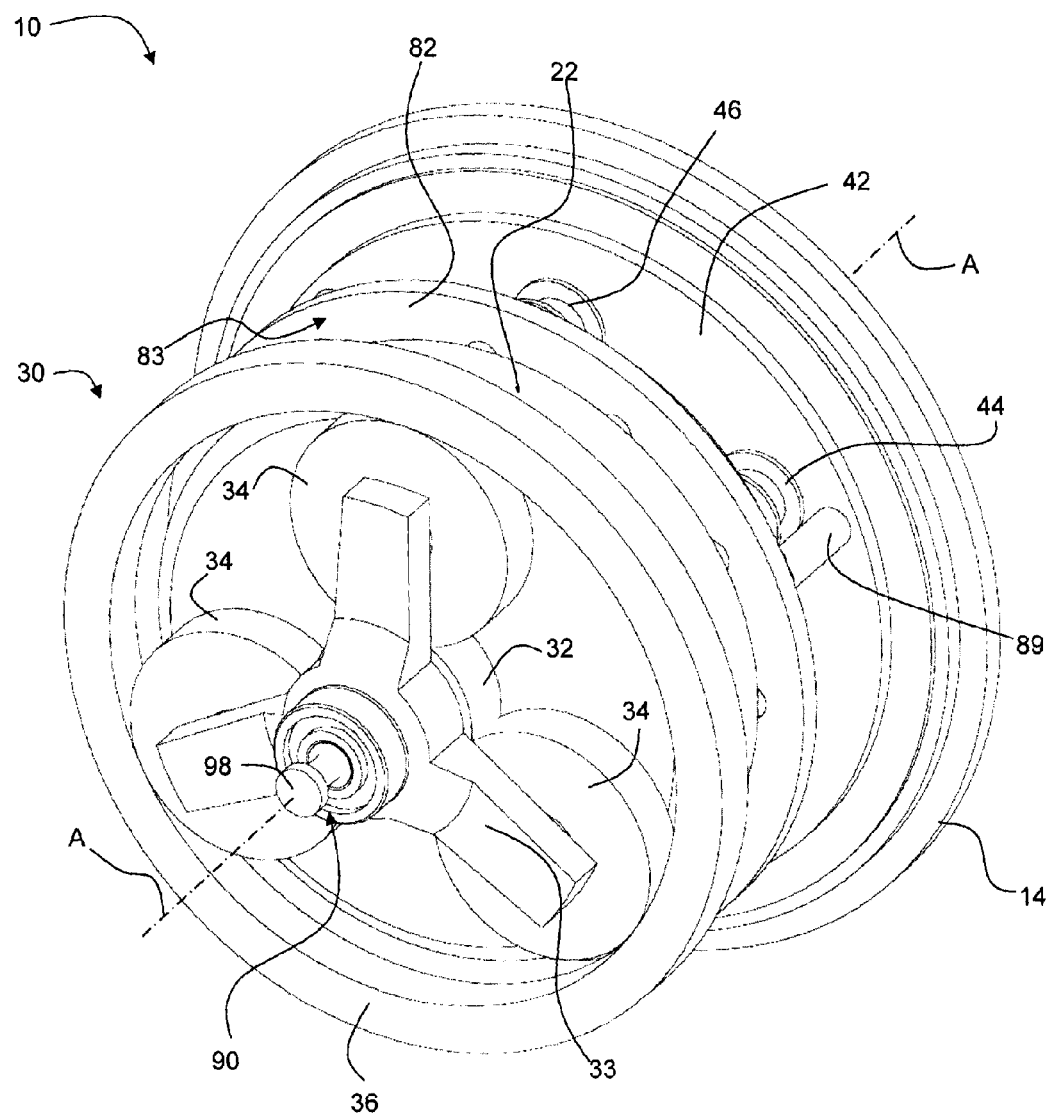
FIG. 1 is a front perspective view of an electric motor for an electric vehicle according to one embodiment shown with the housing removed.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of those various embodiments as described.

Referring now generally to FIGS. 1 to 5, illustrated therein is an electric motor 10 adapted for switching between wye and delta configurations. The motor 10 may be used for various applications, such as on a battery powered electric vehicle, such as a riding lawn mower, a riding snow blower, or another vehicle.

Figure 2:
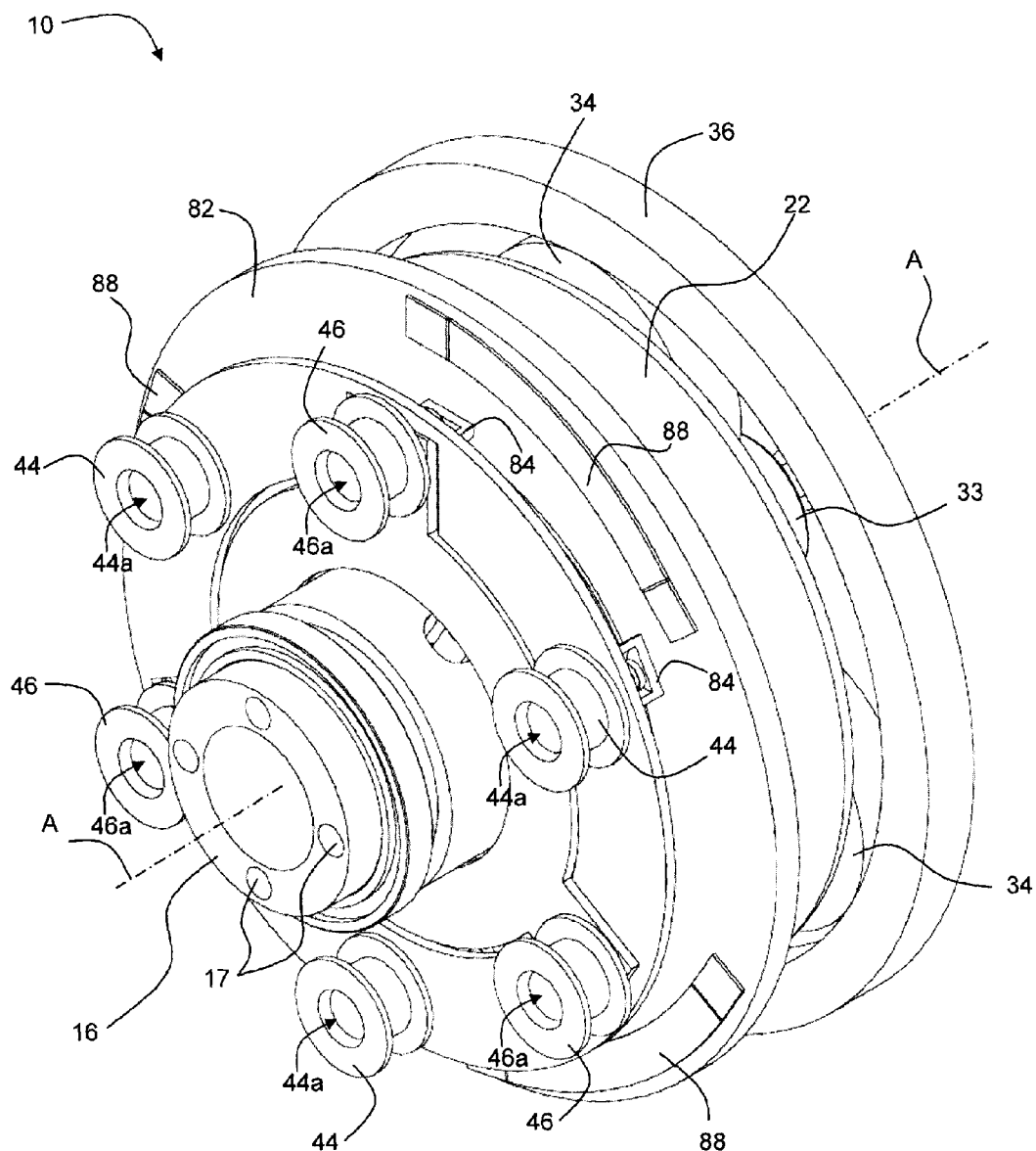
FIG. 2 is a rear perspective view of the electric motor of FIG. 1 with the rear cover and ground plate removed.
Figure 3:
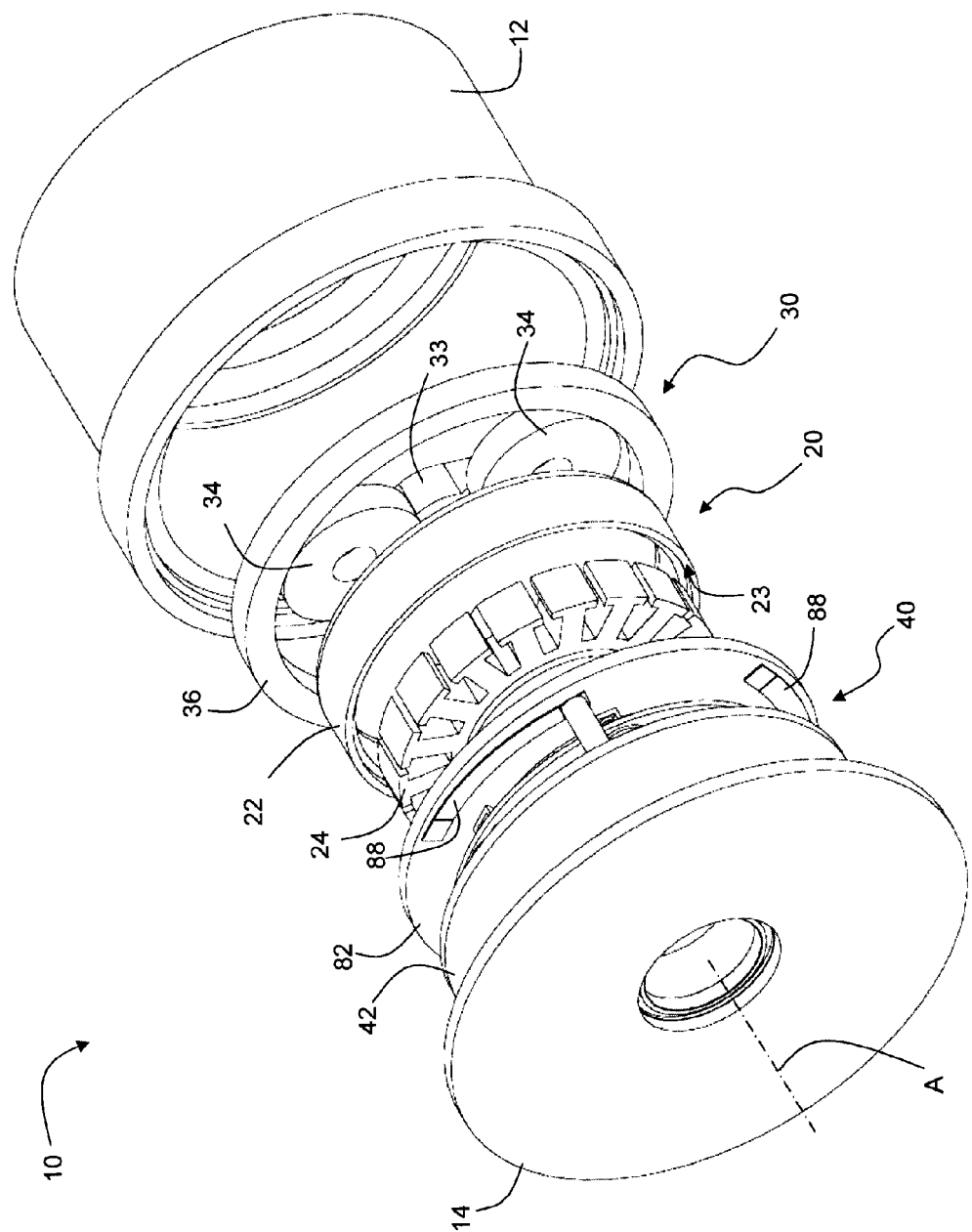
FIG. 3 is an exploded rear perspective view of the electric motor of FIG. 1.

As shown in FIG. 3, the motor 10 includes a housing 12 and rear cover 14, and is adapted to rotate about an axis of rotation A. In some embodiments, the motor 10 may be a hub motor provided in a wheel of a vehicle. For example, the motor 10 may be rigidly mounted to a frame of a vehicle (e.g. a riding mower) by rigidly securing a mounting member 16 to the vehicle frame. This could be done using fasteners (e.g. bolts) that are coupled to holes 17 in the mounting member 16 (as shown in FIG. 2).

During use, the housing 12 and rear cover 14 rotate about the axis of rotation A while the mounting member 16 does not rotate. In some cases, a wheel rim can be secured to or provided as part of the housing 12, and a rubber tire could be secured to the wheel rim.

It will appreciated that while not specifically described herein, various bearings and other rotation-accommodating structures may be used to facilitate the relative rotation between the mounting member 16 and other components such as the housing 12 and rear cover 14.

Referring again to FIG. 3, the motor 10 in this embodiment generally includes a rotor assembly 20, a gear assembly 30, and a switching assembly 40.

The rotor assembly 20 is adapted to receive electrical energy (e.g. from a battery, a fuel cell, etc.) and use this electrical energy to drive the motor 10. In particular, the rotor assembly 20 includes a rotor 22 and a stator 24. In operation, the rotor 22 rotates when a sufficient electrical current is applied to the stator 24 due to the resulting magnetic field. The stator 24 is fixed in place, and in particular may be fixed to the mounting assembly 16.

The gear assembly 30 is generally adapted to convert the outputted rotational speed of the rotor assembly 20 (which may be many hundreds or even thousands of rpm) into a desired output speed for the motor 10 (typically at a much lower rpm). For example, when using the motor 10 in a wheel on a riding mower, the rotor assembly 20 may rotate at a few hundred rpm and the gear assembly 30 may provide a speed reduction of approximately 12.5:1 or more to obtain a desired rotational speed for the wheel.

Referring to FIG. 1, in this embodiment, the gear assembly 30 is a planetary gear assembly, although any suitable gear assembly configuration could be used. More particularly, in this embodiment, the gear assembly 30 includes a sun gear 32, three planetary gears 34 rotatably coupled to the sun gear 32 using a planetary carrier 33, and a ring gear 36. The ring gear 36 is fixed to the housing 12, and is driven by the planetary gears 34 when the motor 10 is active, thereby causing rotation of the housing 12.

One advantage of using a planetary gear assembly is that the gear assembly 30 tends to be relatively compact. This may be particularly useful when the motor 10 is provided within a wheel of a riding mower or other vehicle as the overall width of the motor can be kept small.

It should be noted that in some embodiments the motor 10 may not require a gear assembly 30 where the output speed of the rotor assembly 20 corresponds to a desired output speed of the motor 10.

As introduced above, the motor 10 also includes a switching assembly 40. The switching assembly 40 may be adapted to perform several functions.

Firstly, the switching assembly 40 is adapted so that the winding configuration of the rotor assembly 20 can be changed between a wye configuration and a delta configuration as will be discussed in further detail below. This may be particularly useful as it will allow the motor 10 to be used on a riding mower or other electric vehicle in either a high speed mode (e.g. a delta configuration) or a high torque mode (e.g. a wye configuration).

In some embodiments, the switching assembly 40 may also be used to operate a brake assembly (e.g. brake plate 82) to inhibit movement of the rotor assembly 20. This may be particularly useful as a parking brake that inhibits movement of a stationary riding mower (e.g. the switching assembly 40 may engage the brake 82 to keep a parked riding mower from rolling down a slope).

In some cases the brake may be used to slow the riding mower during movement (e.g. as an emergency brake). While this may be undesirable for repetitive operation as it may cause unwanted mechanical wear within the motor, it may be beneficial as a backup stopping device, particularly in the event of a drive failure or power failure in which case the brake 82 may be configured to automatically engage and slow the vehicle.

In some embodiments, the switching assembly 40 may also be adapted to put the motor 10 into a neutral state by electrically disconnecting the rotor assembly 20, and mechanically decoupling the brake 82. This may be particular useful when pushing or towing a riding lawn mower or other vehicle having one or more motors 10.

Figure 4:
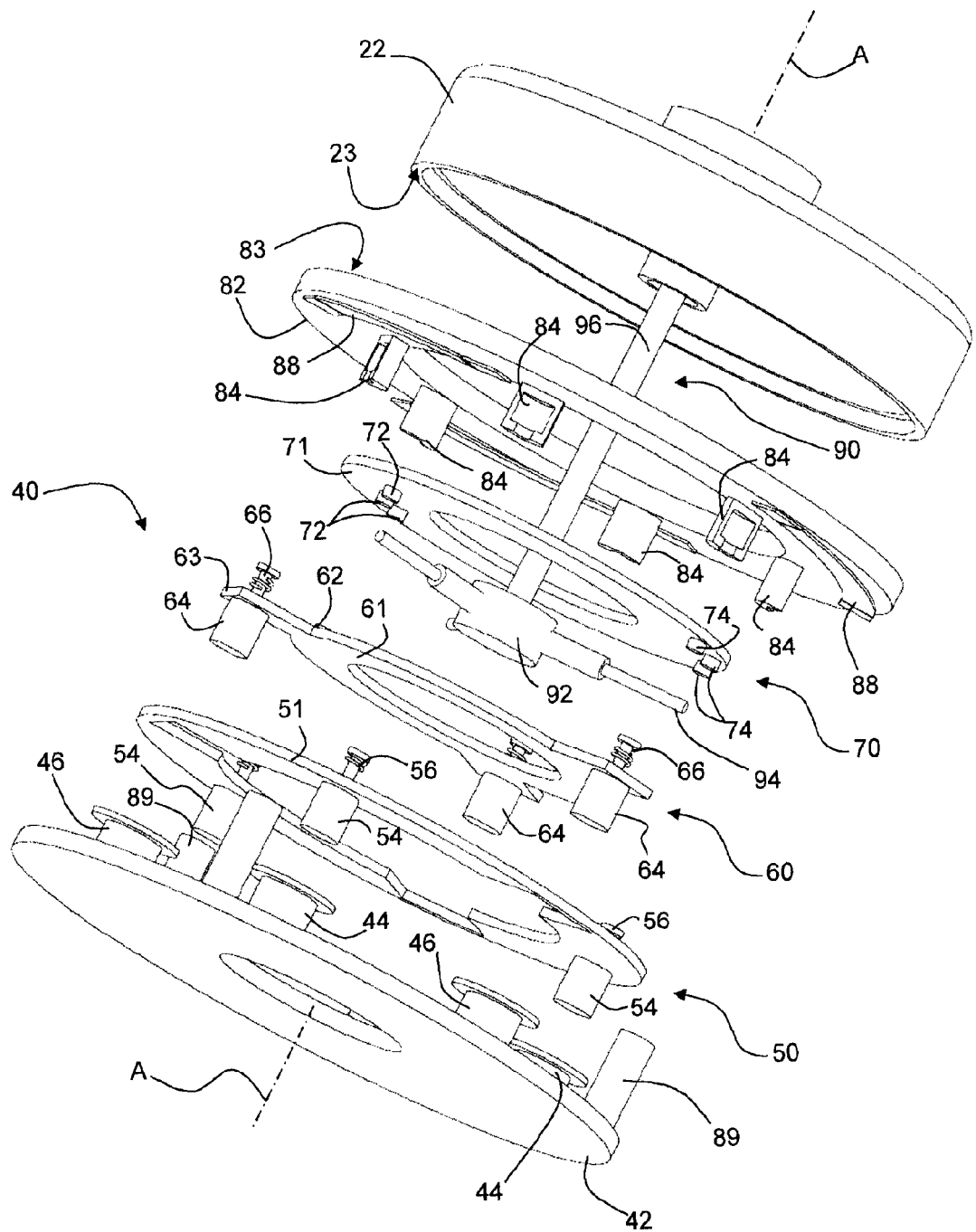
FIG. 4 is an exploded perspective view of the switching assembly, the brake, and the rotor of the motor of FIG. 1.

Turning now to FIGS. 2 and 4, the switching assembly 40 will be described in greater detail. The switching assembly 40 includes a ground plate 42. Mounted to the ground plate 42 are a plurality of actuators, including a set of first actuators 44 and a set of second actuators 46.

The actuators 44, 46 are configured to move at least two movable contact members (or contact plates) so as to select which configuration of the rotor assembly 20 (e.g. wye or delta) is active. In particular, the switching assembly 40 includes a first movable contact member 50 (also called the outer contact plate) and a second movable contact member 60 (also called the inner contact plate) that interact with and are movable by the actuators 44, 46 (in some embodiments along the axis of rotation A).

Moreover, by interacting with the contact members 50, 60, the actuators 44, 46 may also be used to control the brake assembly, and to put the motor 10 into neutral.

The switching assembly 40 also includes a switch member 70 (also called a switch plate). Generally the switch plate 70 is fixed in place (e.g. mechanically secured to the stators 24) and is in electrical communication with the windings of the stator 24. By using the actuators 44, 46 to selectively move one of contact plates 50, 60 into contact with the switch plate 70, the windings of rotor assembly 20 can be switched between a wye configuration and a delta configuration.

Figure 6A:
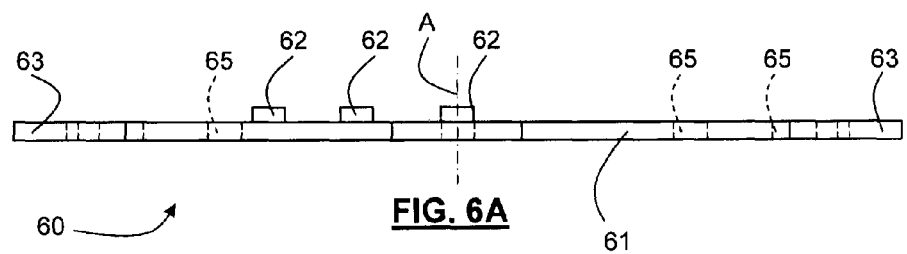
FIG. 6A is a side detail view of the inner contact plate.
Figure 6B:
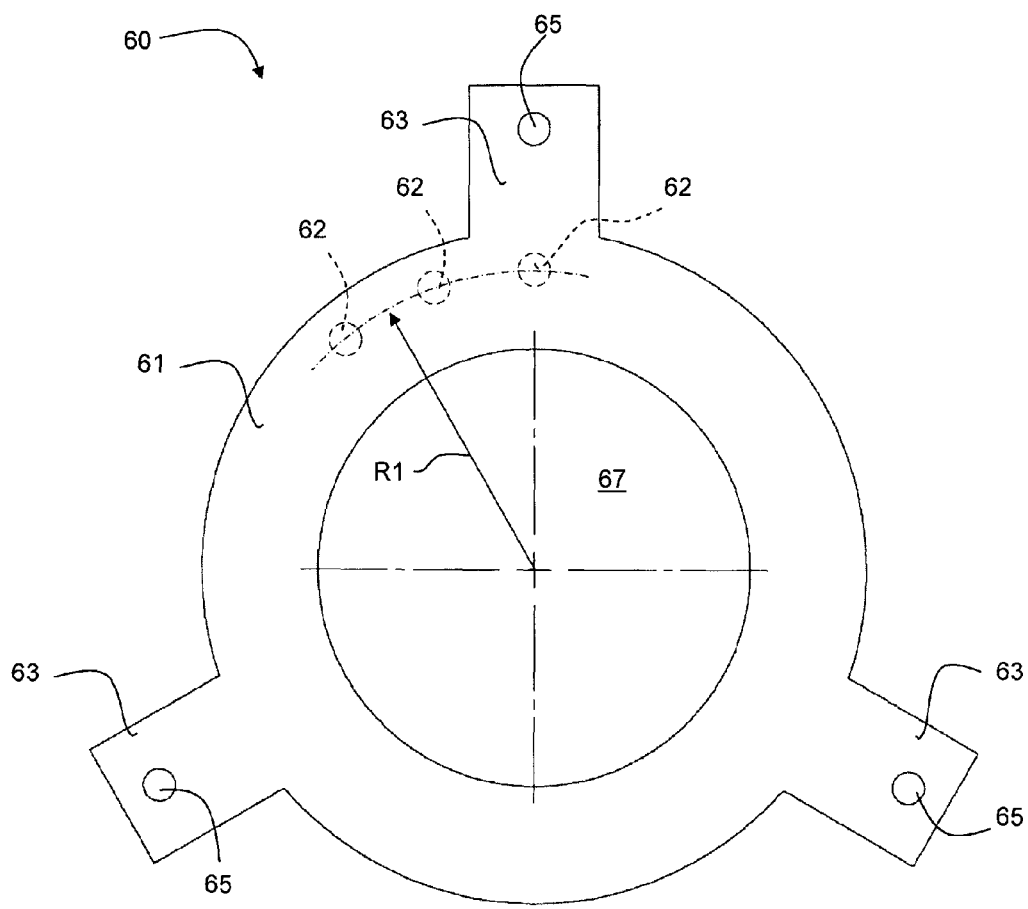
FIG. 6B is a bottom detail view of the inner contact plate.

Turning now to FIGS. 6A and 6B, the inner movable contact plate 60 is shown in greater detail. The inner movable contact plate 60 generally has a thin annular body 61 with three tabs 63 extending radially outwardly therefrom. The body 61 also generally defines an open interior (also called an open central region 67).

The tabs 63 are sized and shaped to pass within recessed portions 53 of the outer movable contact plate 50 (as will be discussed below) so that the inner movable contact plate 60 and outer movable contact 50 can move along the axis of rotation A without interfering with each other.

Each tab 63 also includes an aperture 65 therein. Each aperture 65 is adapted to receive post 64 and rod 66 combination therein (as shown in FIG. 4) for interaction with the second actuators 46 as will be described in greater detail below.

Figure 11:
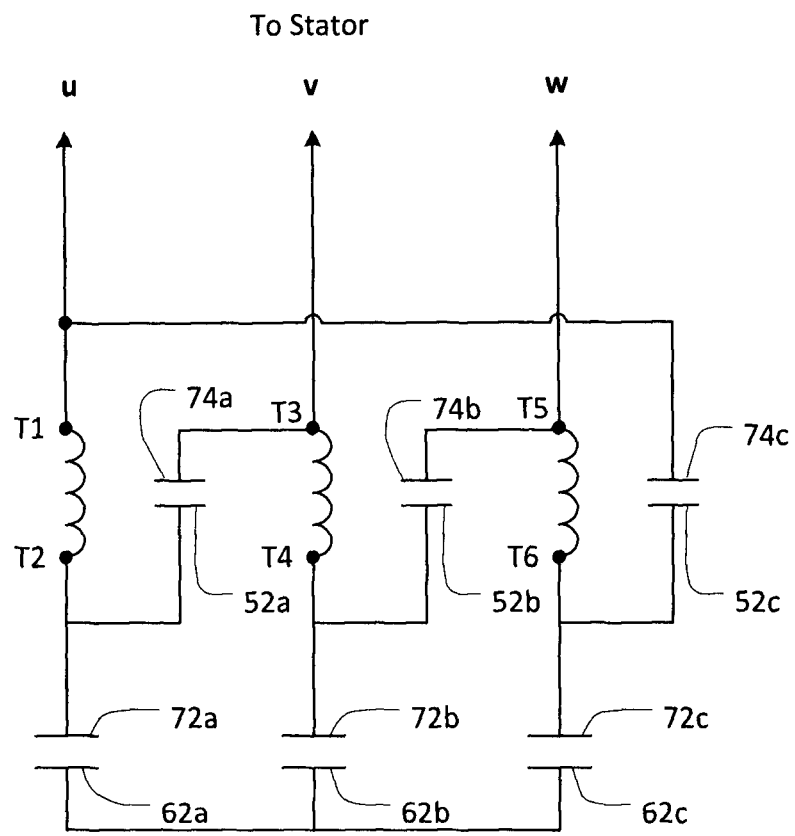
FIG. 11 is a schematic of a circuit diagram showing the wye configuration and delta configuration.

The body 61 includes terminals 62, which in this embodiment extend outwardly along the axis of rotation A (in this embodiment three terminals 62 are provided). The terminals 62 are sized and shaped to align with inner terminals 72 on the switch plate 70 and are electrically configured so that when the terminals 62, 72 are in contact, the windings of the stator 24 will be electrically connected in a first configuration (e.g. wye or delta) as shown in FIG. 11 for example. As shown, the terminals 62 may be aligned along an arc having a radius R1.

Figure 7A:
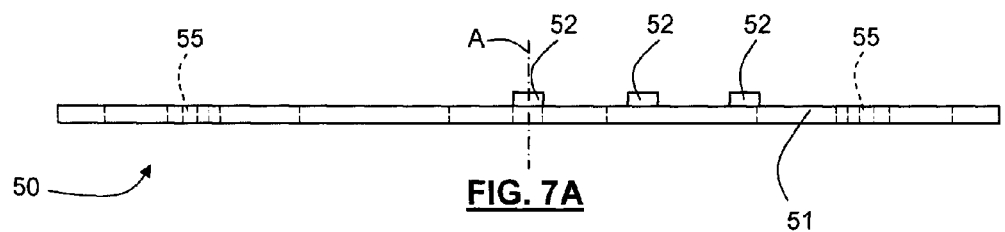
FIG. 7A is a side detail view of the outer contact plate.
Figure 7B:
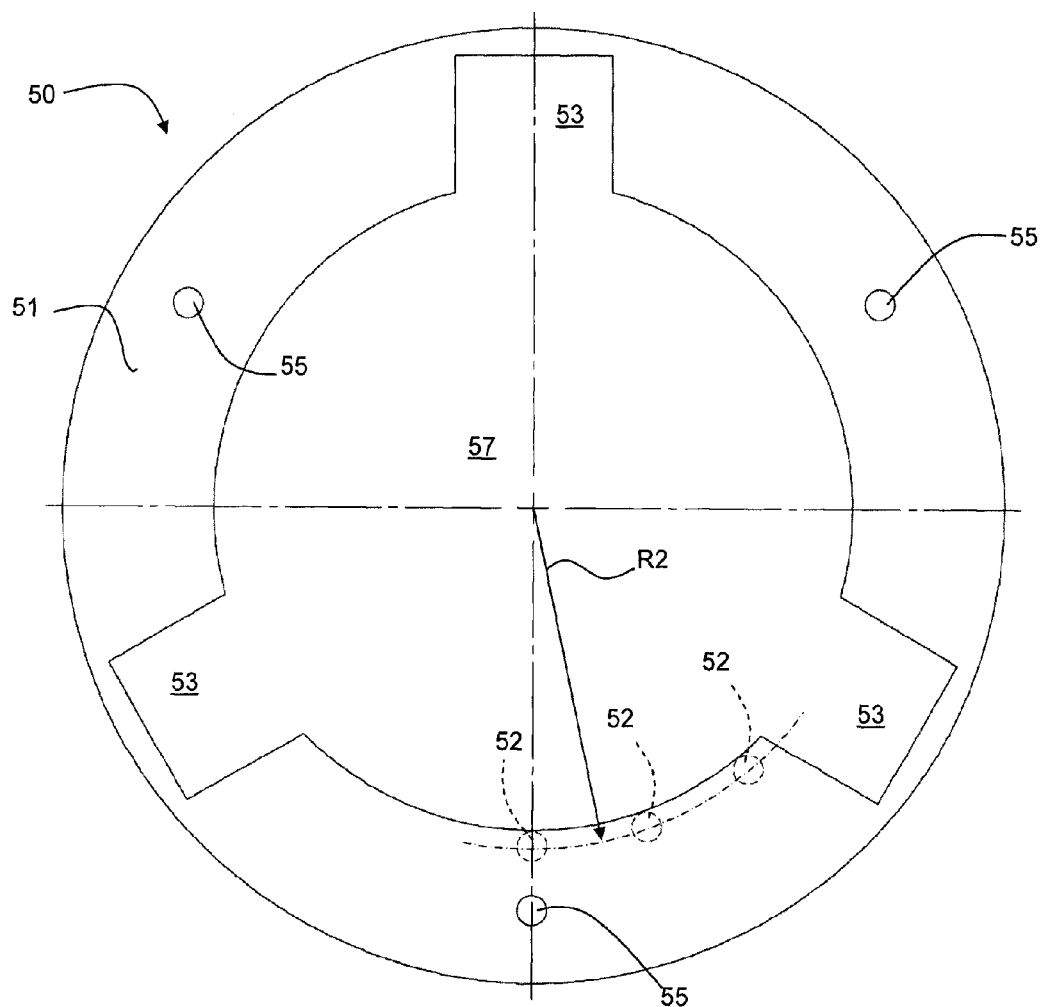
FIG. 7B is a bottom detail view of the outer contact plate.

Turning now to FIGS. 7A and 7B, the outer movable contact plate 50 is shown in greater detail. Similar to the inner movable contact plate 60, the outer movable contact plate 50 generally has a thin annular body 51, and also defines an open central region 57. The body 51 also has recessed portions 53 that allow the tabs 63 of the inner movable contact plate 50 to move therethrough.

The body 51 also includes a plurality of apertures 55 therein. Each aperture is adapted to receive a post 54 and rod 56 combination (as shown in FIG. 4) for interaction with the actuators 44 as will be described below.

The body 51 also includes terminals 52 that extend outwardly along the axis of rotation A therefrom (in this embodiment three terminals 52 are provided). As shown the terminals 52 are sized and shaped to align with outer terminals 74 on the switch plate 70. The terminals 52 are electrically configured so that when in contact with the outer terminals 74, the windings of the stator 24 will be in a second configuration (e.g. delta or wye) that is different from the first configuration. As shown, the terminals 52 may be aligned along an arc having a second radius R2.

Figure 8A:
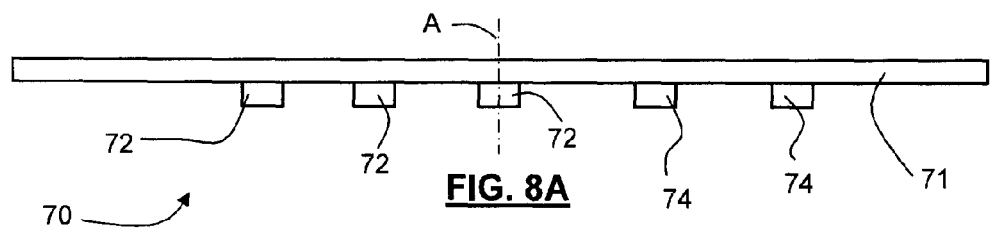
FIG. 8A is a side detail view of the switch plate.
Figure 8B:
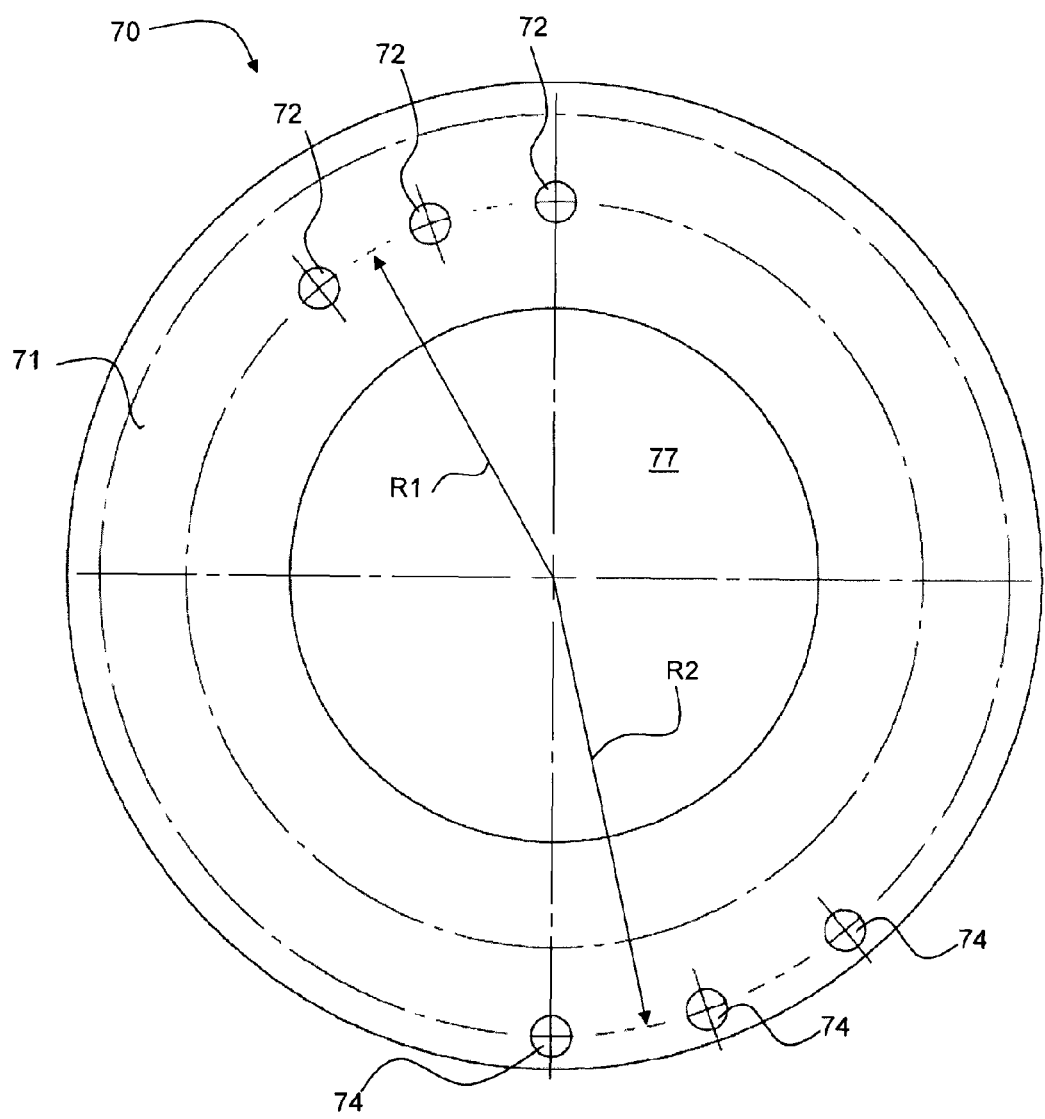
FIG. 8B is a bottom detail view of the switch plate.

Turning now to FIGS. 8A and 8B, the switch plate 50 is shown in greater detail. Similar to the contact plates 50, 60, the switch plate 70 generally has a thin annular body 71, and defines an open central region 77.

The body 71 also includes inner terminals 72 and outer terminals 74 that extend outwardly along the axis of rotation A. The inner terminals 72 and the outer terminals 74 are sized and shaped to align with the terminals 62 and terminals 52 respectively. In particular, the three inner terminals 72 may be located along a first radius R1 for engagement with the terminals 62 on the inner movable contact plate 60, and the three outer terminals 74 may be located along a second radius R2 for engagement with the terminals 52 on the outer movable contact plate 50

In this embodiment, the inner terminals 72 and the terminals 62 of the inner contact plate 60 are electrically configured so that when in contact, the windings of the stator 24 are in a delta configuration. Conversely, the outer terminals 74 and the terminals 52 of the outer contact plate 50 are electrically configured so that when in contact, the windings of the stator 24 are in a wye configuration. For example, FIG. 11 shows one possible configuration for the terminals 62 on the inner contact plate 60 (e.g. terminals 62a, 62b, 62c), terminals 52 on the outer contact plate 50 (e.g. terminals 52a, 52b, 52c), and the terminals 72, 74 on the switch plate 70 (e.g. terminals 72a, 72b, 72c, 74a, 74b, 74c).

It will be appreciated that in other embodiments the configurations of the contact plates 50, 60 and switch plate 70 could be reversed. In particular, the inner contact plate 60 could be used to provide the wye configuration and the outer contact plate 50 could be used to provide the delta configuration.

In this embodiment, the plates 50, 60, 70 are thin plates, and could be printed circuit boards (PCB), each having the desired electrical connections between terminals 52, 62, 72 embedded within the PCB. In other embodiments the plates 50, 60, 70 could be other contact members and have other shapes and arrangements.

Turning now to FIGS. 2 and 4, the operation of the actuators will be described in greater detail. In this embodiment, the actuators 44, 46 may be electromagnetic coils each having a central opening 44a, 46a (respectively) which is surrounded by wire windings. The openings 44a, 46a of the actuators 44, 46 are aligned with the posts 54, 64 (respectively) that are connected to the contact plates 50, 60, and the actuators 44, 46 cooperate with the posts 54, 64 to form "voice coils".

In use, the contact plates 50, 60 are normally biased into contact with the switch plate 70 (for example using one or more springs, magnets etc.) so that the terminals 52, 62, are in contact with the inner terminals 72 and outer terminals 74 when the actuators 44, 46 are deactivated.

When an electrical current is applied to the actuators 44, 46, magnetic fields are created that draw the posts 54, 64 into the openings 44a, 46a. This moves the contact plates 50, 60 away from the switch plate 70, disconnecting the terminals 52, 62, 72, and 74.

In some embodiments, the posts 54, 64 include one or more magnetic elements (e.g. permanent magnets) so that they readily respond to the windings of the actuators 44, 46 and so that they tend to latch when no power is provided to the actuators 44, 46. In other embodiments, the posts 54, 64 need not be magnetic but could be ferrous and will not latch.

As discussed above, the actuators 44, 46 can also control the movement of the brake plate 82. In particular, each post 54, 64 is connected to a rod 56, 66, and each rod is received within a sleeve 84 secured to the brake plate 82.

Figure 5:
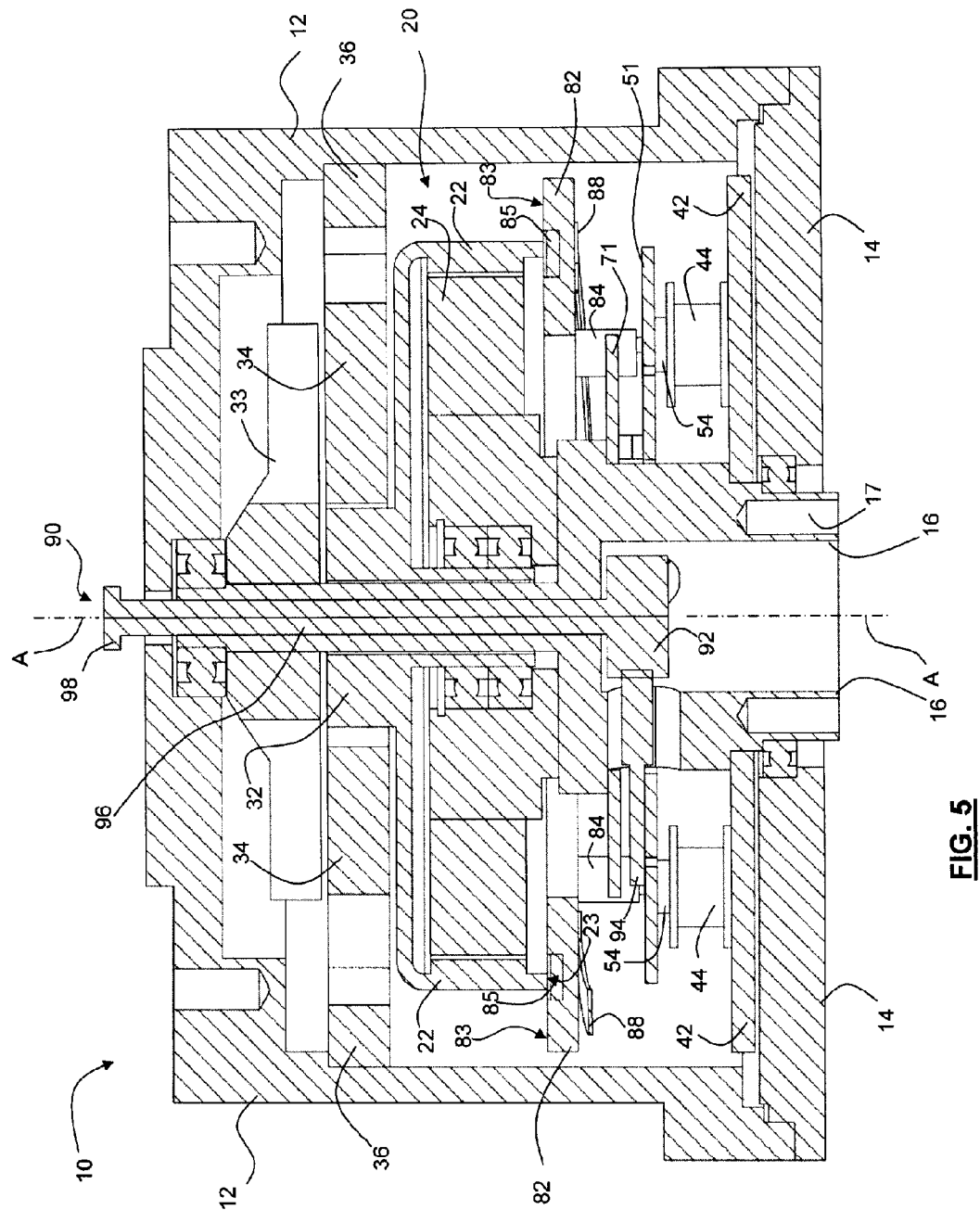
FIG. 5 is a cross-sectional elevation view of the motor of FIG. 1.

In this embodiment, the actuators 44, 46 are "normally closed". As such, when the actuators 44, 46 are in a deactivated state (as shown in FIGS. 5 and 9A), a surface 83 of the brake plate 82 will be biased into contact with an edge 23 or another portion of the rotor 22. This biasing may be accomplished using springs 88, with each spring 88 supported by a spring support 89, which could be a post extending outwardly along the axis of rotation A from the ground plate 42. The surface 83 of the brake plate 82 may also include one or more magnets 85 that magnetically attract the edge 23 of the rotor 22.

This interaction between the brake plate 82 and the rotor 22 inhibits the rotor assembly 20 from rotating, and acts as a mechanical brake that may be particularly suited for use as a parking brake or an emergency brake.

Moreover, when the actuators 44, 46 are deactivated, the terminals 52, 62, 72 and 74 are in contact, which creates an electrical short condition in the stator 24, which generates a back emf that provides a magnetic brake that further inhibits the rotor assembly 20 from turning.

However, when the actuators 44, 46 are in an activated state, the contact plates 50, 60 are pulled away from the switch plate 70 and the magnetic brake is deactivated. Moreover the rods 56, 66 act on the sleeves 84 and pull the brake plate 82 away from the rotor 22, thus decoupling the mechanical brake.

Using actuators 44, 46 that are normally closed may be advantageous, as it may provide a fail safe that automatically engages the brake 82 during a power failure or drive failure.

Turning now to FIGS. 9A to 9D, the operation of the actuators 44, 46 will now be described in further exemplary detail.

FIG. 9A is a side view of the motor of FIG. 1 with the actuators 44, 46 deactivated. As shown, the brake plate 82 is in contact with the rotor 22 and the terminals 52, 62 of both movable contact plates 50, 60 are in contact with the respective terminals 72 and 74 of the switch plate 70. This can be described as a "brake on" state.

Turning to FIG. 9B, both sets of actuators 44, 46 have now been activated, and the brake plate 82 has been decoupled from the rotor 22. In some embodiments, a relatively large amount of electrical energy may be required to break the contact between the brake plate 82 and the rotor 22, particularly when a magnet 85 is used to assist with drawing the brake plate 82 towards the rotor 22. However, once the brake plate 82 has been decoupled, the magnetic attractive force may be greatly diminished (due to the gap between the rotor 22 and the brake plate 82) and a much smaller amount of energy may be required to hold the brake plate 82 in position away from the rotor 22.

As also shown in FIG. 9B, the terminals 52, 62 of both movable contact plates 50, 60 have been decoupled from the respective terminals of 72, and 74 the switch plate 70. The motor 10 is now in a "neutral" state. This may be particularly helpful when the motor 10 is in a riding lawn mower or other electric vehicle that is being pushed or towed. In particular, breaking the electrical connections between the terminals 52, 62, 72, and 74 may prevent the rotor assembly 20 from being damaged due to excessive voltages that might otherwise be generated within the rotor assembly 20 when the vehicle is pushed or towed too quickly.

Turning now to FIG. 9C, the first set of actuators 44 are in the deactivated state, while the second set of actuators 46 remain in the active state. Upon deactivating the first set of actuators 44, the posts 54 are released from the magnetic field, and the outer contact plate 50 (which is biased towards the switch plate 70) moves away from the actuators 44, allowing the terminals 52 to once again make contact with the outer terminals 74 on the switch plate 70. In this embodiment, this places the rotor assembly 20 in a "wye configuration".

Conversely, in FIG. 9D the second set of actuators 46 are in the deactivated state, while the first set of actuators 44 remain in the active state. Upon deactivating the second set of actuators 46, the posts 56 are released from the magnetic field and the inner contact plate 60 moves back towards the switch plate 70, connecting the terminals 62 to the inner terminals 72. In this embodiment, this places the rotor assembly 20 in a "delta configuration".

Accordingly, the rotor assembly 20 can be operated in either a wye configuration or a delta configuration depending on the particular desired operating characteristics (e.g. high top speed or high torque) for the motor 10 and vehicle.

It should be noted that the rotor assembly 20 is generally not actively powered when switching between wye and delta configurations, as this could lead to arcing or shorts which could overload or otherwise damage the motor 10.

Figure 10:
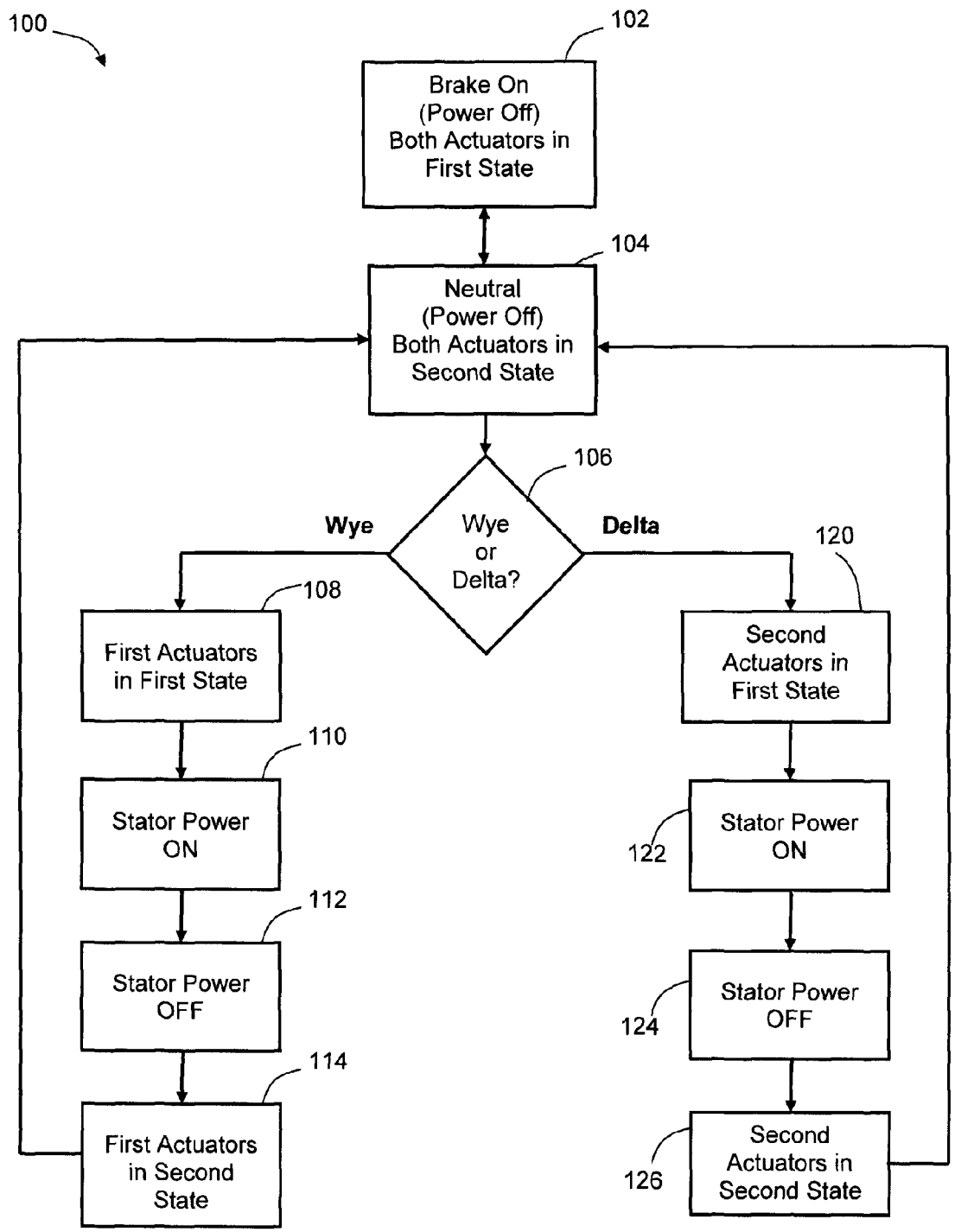
FIG. 10 is a method of operating a motor according to some embodiments.

Accordingly, FIG. 10 shows a method 100 of operating a motor (e.g. motor 10) when switching between wye and delta configurations.

At step 102, the motor 10 is in a "brake on" state, and is effectively parked. For example, the brake plate 82 may be in contact with the rotor 22, mechanically inhibiting the motor 10 from moving. The terminals 52, 62, 72 and 74 are also in contact, shorting the stator 22 and providing magnetic resistance to movement. At step 102, both sets of actuators 44, 46 are in a first state, which in the "normally closed" embodiment as shown is a deactivated state (in other embodiments the first state could be an activated state). Notably at step 102, no power is being provided to the stator 24 (e.g. the rotor assembly 20 is unpowered).

At step 104, both sets of actuators 44, 46 are put into a second state, which in the illustrated embodiment is an activated state. In particular, the actuators 44, 46 are activated with sufficient energy to decouple the brake plate 82 and the rotor 22, and to separate the terminals 52, 62, 72, 74. The motor 10 is now in a neutral state. Notable, still no power is provided to the stator 24.

As shown in FIG. 10, the motor 10 can generally be moved between the "brake on" and "neutral" states by activating and deactivating all the actuators 44, 46, since the stator 24 is depowered in both states.

At step 106, a decision is made whether to activate the wye configuration (proceed to step 108) or the delta configuration (proceed to step 120). In some embodiments, this decision may be made by a user of a vehicle selecting the desired configuration using a switch. In other embodiments, the switching may be determined automatically (e.g. by an electronic controller) depending on observed or measured operating characteristics (e.g. current vehicle speed, ground conditions, etc.)

At step 108, the wye configuration is engaged. In the example given herein, the outer contact plate 50 is adapted to provide the wye configuration, therefore at step 108 the first set of actuators 44 (e.g. the wye voice coils) are put into the first state (e.g. the deactivated state). This releases the contact plate 50 allowing it to contact the switch plate 70 and put the rotor assembly 20 into the wye configuration.

Then, at step 110, power can now be provided to the stator 24. The rotor assembly 20 then becomes active, allowing the motor 10 to drive the vehicle. The motor 10 can be operated in this mode as long as desired, for example until the user wants to deactivate the riding mower, or change into another configuration (e.g. the delta configuration).

To stop the motor 10 or change configurations, the method 100 proceeds to step 112 where the stator 24 is firstly depowered. Once the stator 24 is depowered, the wye actuators (e.g. the first actuators 44) are returned to the second state (e.g. are reactivated in this embodiment), putting the motor 10 back into neutral (at step 104). The method 100 can then be used to put the motor 10 into a "break on" state (e.g. step 102) or to switch into the delta configuration.

Switching to delta configuration is performed in a similar manner as the wye configuration. At step 120, from the neutral state, the delta actuators (e.g. the second actuators 46) are put into the first state (e.g. the deactivated state), placing the rotor assembly 20 into the delta configuration.

At step 122, the stator 24 can then be powered and the motor 10 used to drive the mower. As with the wye configuration, the motor 10 can remain in this state for as long as desired.

When it is desired to stop the motor 10 or change configurations, the method 100 proceeds to step 124 where power to the stator 24 is first disconnected. The delta actuators (e.g. actuators 46) can then be returned to the first state (e.g. reactivated) to return the motor 10 to the neutral state (at step 104).

Turning now again to FIGS. 1, 4 and 5, in some embodiments, the motor 10 may include a manual brake override 90 adapted to mechanically disconnect the brake plate 82 from the rotor 22 and to decouple the terminals 52, 62, 72 and 74.

In particular, the manual brake override 90 may include a central shaft 96 that runs through the motor 10. The outer end of the shaft 96 may include an actuator 98 (e.g. a handle) for depressing or otherwise activating the manual brake override 90. The opposing end of the shaft 96 inside the motor 10 may include a central member 92 and a plurality of spokes 94 (shown in FIG. 4). When the actuator 98 is activated, the spokes 94 can extend outwardly and manually force the brake plate 82 and rotor 22 apart, as well as separate the terminals 52, 62, 72, 74. This effectively forces the motor 10 into a neutral state even when the actuators 44, 46 are deactivated. This may be useful for example when the battery has been removed and the vehicle is to be towed or pushed.

Figure 9E:
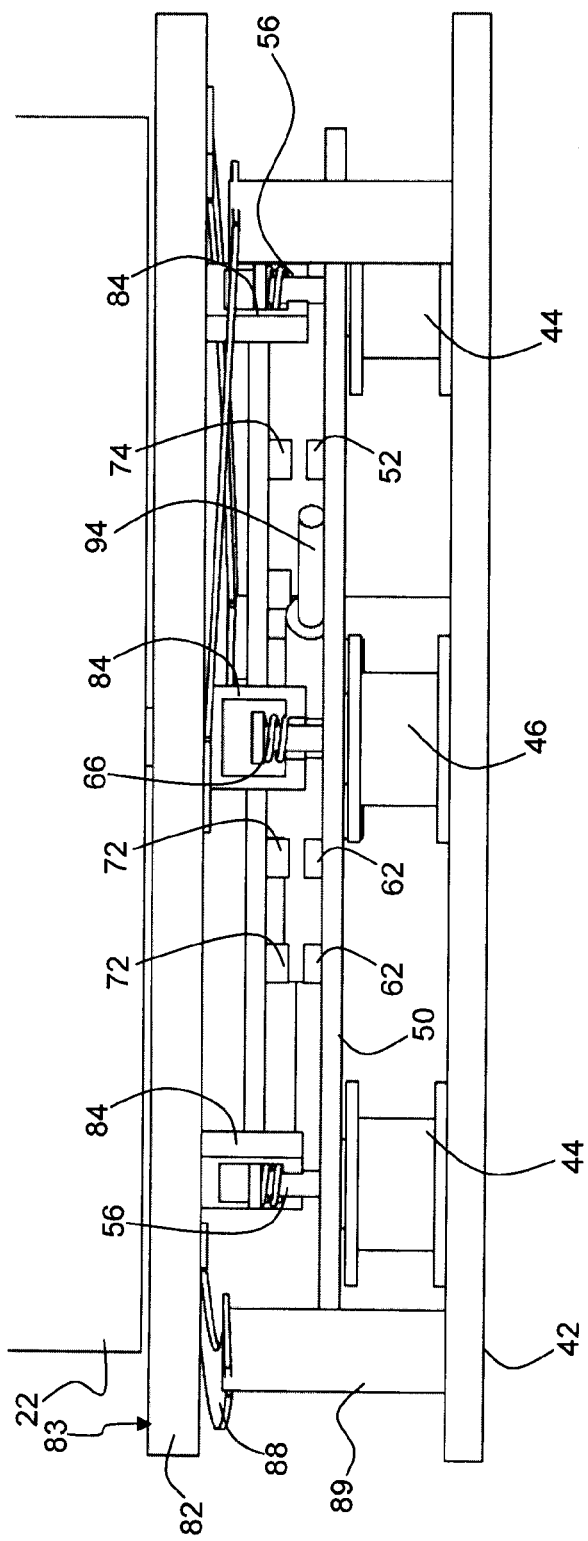
FIG. 9E is a side view of the motor of with the brake manually released using a manual override.

As discussed above, putting the motor 10 in neutral may prevent the rotor assembly 20 from being damaged due to high voltages that might otherwise be generated in the rotor assembly 20 when the mower is pushed or towed too fast. FIG. 9E is a side view of the motor with the brake plate 82 manually released using the manual override 90.

While the above description provides examples of one or more apparatus, methods, or systems, it will be appreciated that other apparatus, methods, or systems may be within the scope of the present description as interpreted by one of skill in the art.

The invention claimed is:

1. An electric motor, comprising:
a motor assembly including a rotor and a stator; and
a switching assembly adapted to switch the motor assembly between a wye configuration, a delta configuration, and a neutral configuration,
wherein the switching assembly comprises a plurality of actuators configured to move at least two movable contact members so as to select which configuration of the motor assembly is active,
the at least two movable contact members including a first contact plate and a second contact plate,
the actuators including first actuators for moving the first contact plate and second actuators for moving the second contact plate selectively into contact with a switch plate that is in electrical communication with windings of the stator; and
wherein when the actuators move the first contact plate into contact with the switch plate, the windings of the stator are in the wye configuration, and when the actuators move the second contact plate into contact with the switch plate, the windings of the stator are in the delta configuration.

2. The electric motor of claim 1, wherein each contact plate includes at least one terminal adapted to engage with at least one terminal on the switch plate.

3. The electric motor of claim 2 wherein the first contact plate is an inner contact plate having terminals aligned with inner terminals on the switch plate and the second contact plate is an outer contact plate having terminals aligned with outer terminals on the switch plate.

4. The electric motor of claim 2 wherein the contact plates are biased into contact with the switch plate.

5. The electric motor of claim 1 wherein the contact plates are thin plates.

6. The electric motor of claim 5 wherein the thin plates are printed circuit boards each having electrical connections between terminals embedded therein.

7. The electric motor of claim 1 wherein each contact plate includes at least one post adapted to be received within one of the actuators.

8. An electric motor, comprising:
(a) a motor assembly including a rotor and a stator; and
(b) a switching assembly adapted to switch the motor assembly between a wye configuration, a delta configuration, and a neutral configuration;
wherein the switching assembly comprises a plurality of actuators configured to move at least two movable contact members so as to select which configuration of the motor assembly is active, and
wherein the at least two movable contact members include a first contact plate and a second contact plate, and the actuators include first actuators for moving the first contact plate and second actuators for moving the second contact plate selectively into contact with a switch plate.

9. The electric motor of claim 8, wherein:
(a) the switch plate is in electrical communication with windings of the stator; and
(b) when the actuators move the first contact plate into contact with the switch plate, the windings of the stator are in the wye configuration, and when the actuators move the second contact plate into contact with the switch plate, the windings of the stator are in the delta configuration.

10. The electric motor of claim 8, wherein each contact plate includes at least one terminal adapted to engage with at least one terminal on the switch plate.

11. The electric motor of claim 10 wherein the first contact plate is an inner contact plate having terminals aligned with inner terminals on the switch plate and the second contact plate is an outer contact plate having terminals aligned with outer terminals on the switch plate.

12. The electric motor of claim 8 wherein the contact plates are biased into contact with the switch plate.

13. The electric motor of claim 8 wherein each contact plate includes at least one post adapted to be received within one of the actuators.

14. The electric motor of claim 13, wherein each post includes one or more magnetic elements and wherein the actuators are voice coils.

15. The electric motor of claim 14, further comprising a brake plate and wherein, when the actuators are deactivated, a surface of the brake plate will be biased into contact with the rotor.

16. The electric motor of claim 8 wherein the contact plates are thin plates.

17. The electric motor of claim 16 wherein the thin plates are printed circuit boards each having electrical connections between terminals embedded therein.

18. A vehicle comprising an electric motor, the electric motor comprising:
a motor assembly including a rotor and a stator; and
a switching assembly adapted to switch the motor assembly between a wye configuration, a delta configuration, and a neutral configuration,
wherein the switching assembly comprises a plurality of actuators configured to move at least two movable contact members so as to select which configuration of the motor assembly is active,
the at least two movable contact members including a first contact plate and a second contact plate,
the actuators including first actuators for moving the first contact plate and second actuators for moving the second contact plate selectively into contact with a switch plate that is in electrical communication with windings of the stator; and wherein when the actuators move the first contact plate into contact with the switch plate, the windings of the stator are in the wye configuration, and when the actuators move the second contact plate into contact with the switch plate, the windings of the stator are in the delta configuration.

\* \* \* \* \*